United States Patent [19]

Chen et al.

[11] Patent Number: 5,608,458
[45] Date of Patent: Mar. 4, 1997

[54] METHOD AND APPARATUS FOR A REGION-BASED APPROACH TO CODING A SEQUENCE OF VIDEO IMAGES

[75] Inventors: Homer H. Chen, Lincroft, N.J.; Touradj Ebrahimi, Ecublens, Switzerland; Barin G. Haskell, Tinton Falls, N.J.; Caspar Horne, Beaverton, Oreg.

[73] Assignee: Lucent Technologies Inc., Murray Hill, N.J.

[21] Appl. No.: 322,893

[22] Filed: Oct. 13, 1994

[51] Int. Cl.[6] ........................................... H04N 7/32
[52] U.S. Cl. ..................... 348/413; 348/416; 348/420; 348/699
[58] Field of Search ................................. 348/394, 395, 348/397, 400, 401, 402, 405, 409, 411, 412, 413, 415, 416, 420, 699; 382/236, 238, 173, 240

[56] References Cited

U.S. PATENT DOCUMENTS

| | | |
|---|---|---|
| 4,729,021 | 3/1988 | Kondo . |
| 4,922,341 | 5/1990 | Strobach . |
| 5,117,287 | 5/1992 | Koike et al. . |
| 5,164,828 | 11/1992 | Tahara et al. ........................... 348/412 |
| 5,241,383 | 8/1993 | Chen et al. ........................... 348/405 |
| 5,295,201 | 3/1994 | Yokohama . |
| 5,422,963 | 6/1995 | Chen et al. ........................... 348/395 |
| 5,440,346 | 8/1995 | Alattar et al. ......................... 348/397 |

OTHER PUBLICATIONS

Gilge, M., et al., "Coding of Arbitrarily Shaped Image Segments Based on a Generalized Orthogonal Transform," Signal Processing: Image Communication, vol. 1, No. 2, Oct. 1989, pp. 153–180.

Hotter, M., "Object–oriented Analysis–synthesis Coding Based on Moving Two–dimentional Objects," Signal Processing: Image Communication, vol. 2, No. 4, Dec. 1990, pp. 409–428.

Li, W., and Bhaskaran, V., "A Very Low Bit–rate Video Codec Using Segmentation Based DFD Coding and Motion Vector Processing," International Workshop on Coding Techniques for Very Low Bitrate Video, VLBV '94, Apr. 1994, 4 pages.

Mussman, H. G., et al., "Object–oriented Analysis–synthesis Coding of Moving Images," Signal Processing: Image Communication, vol. 1, No. 2, Oct. 1989, pp. 117–138.

"Visual Medical Laboratory," Annual Report, 1993, pp. 12–13.

*Primary Examiner*—Amelia Au

[57] ABSTRACT

An encoder segments frames in a sequence of digital images into multiple regions of arbitrary shape each of which has a corresponding motion vector relative to a previous decoded frame. A hierarchical multi-resolution motion estimation and segmentation technique, which segments the frame into multiple blocks and which assigns a best motion vector to each block is used. Blocks having the same or similar motion vector are then merged to form the arbitrarily-shaped regions. The shape of each region is coded, and a decision is made to code additional image data of each region in one of three modes. In a first inter-frame mode, a motion vector associated with a region is encoded. In a second inter-frame mode, a prediction error for the region is also encoded. In an intra-frame mode, the intensity of each picture element in the region is encoded. A region interior coder with frequency domain region-zeroing and space domain region-enforcing operations is employed for effectively coding the interior image data of the arbitrarily-shaped regions. The region interior coder uses an iterative technique based on the theory of successive projection onto convex sets (POCS) to find the best values for a group of selected transform coefficients. The coded information, including the shape of the region, the choice of the mode, and the motion vector and/or the region's interior image data, may then be transmitted to a decoder where the image can be reconstructed.

49 Claims, 6 Drawing Sheets

METHOD AND APPARATUS FOR A REGION-BASED APPROACH TO CODING A SEQUENCE OF VIDEO IMAGES

FIELD OF THE INVENTION

The present invention relates generally to a method and apparatus for coding a video sequence, and, in particular, to a region-oriented method and apparatus for coding arbitrarily-shaped regions of video images.

BACKGROUND OF THE INVENTION

Many approaches to encoding a sequence of digital video images are known in the art. One classical approach is to divide each frame in the sequence into square blocks of predetermined size also known as macroblocks. Each macroblock is then assigned a motion vector relative to a previous decoded frame, where the motion vector represents the offset between the current macroblock and a block of pixels of the same size in a previous reconstructed frame that forms a best match. The motion vector is transmitted to a decoder which can then reconstruct the current frame based upon the previous decoded frame, the motion vector and a prediction error. Block-based techniques, however, can lead to distortions such as blocking and mosquito effects in low bit-rate applications.

A more complex object-oriented, or region-oriented, approach encodes arbitrarily-shaped regions instead of rectangular or square blocks. While block-oriented coding techniques typically transmit two parameter sets, specifically the motion and color of each block, an object-oriented approach requires that the shape of each region be transmitted as well in order to allow reconstruction of the image. For example, in M. Hotter, "Object-Oriented Analysis-Synthesis Coding Based On Moving Two-Dimensional Objects," *Signal Processing: Image Communication*, Vol. 2, pp. 409–428 (1990), an encoder which encodes arbitrarily-shaped regions is presented, where objects are described by three parameter sets defining their motion, shape and color. A priority control determines in which of two modes the coded information will be sent based upon the success or failure of the motion estimation technique for a particular region. The shape coding technique considered in the aforementioned article approximates the shape of each region by a combination of polygon and spline representation of the shape. U.S. Pat. No. 5,295,201 also discloses an object-oriented encoder which includes an apparatus for approximating the shape of an arbitrarily-shaped region to a polygon. The vertices of the polygon are determined, and the coordinate values of the vertices are calculated and transmitted.

One color coding technique for use in object-oriented approaches is presented in Gilge et al., "Coding of Arbitrarily Shaped Image Segments Based On A Generalized Orthogonal Transform," *Signal Processing: Image Communication*, Vol. 1, pp. 153–180 (1989). According to the technique disclosed in this article, an intensity function inside each region is approximated by a weighted sum of basis functions which are orthogonal with respect to the shape of the region to be coded. While this technique may be theoretically useful, it is not practicable for implementation in a real-time system.

Due to the potential advantages of an object-oriented approach, there exists a need for an object-oriented encoder which provides powerful schemes for segmenting an image into arbitrarily-shaped regions, each of which has a corresponding motion vector, and for representing the segment content in a manner which can be readily implemented for use in real-time. It is also desirable to have an encoder which can encode a generic scene or sequence of images, the content of which is not known beforehand, in contrast to the requirements of the prior art. It is further desirable to provide an encoder which permits additional functionalities, such as tracking objects moving from one area of a scene to another between images in a sequence.

SUMMARY OF THE INVENTION

The present invention discloses an encoder for encoding a sequence of video frames. The encoder comprises a segmentation unit which segments a current frame in the video sequence into a plurality of arbitrarily-shaped regions, where each of the plurality of arbitrarily-shaped regions is assigned a motion vector. The encoder also has a decoded frame memory for storing a previously decoded frame in the video sequence and a prediction unit connected to the segmentation unit and the decoded frame memory for predicting image data of the current frame based upon a previously decoded frame and based upon the motion vector assigned to one of the plurality of arbitrarily-shaped regions. The encoder further comprises a region shape coding unit for encoding the shape of each of the arbitrarily-shaped regions.

A mode decision unit determines in which one of a plurality of modes image data from each of the plurality of arbitrarily-shaped regions is to be encoded. The plurality of modes comprises a first inter-frame mode in which a motion vector associated with one of the plurality of arbitrarily-shaped regions is encoded and a second inter-frame mode in which a motion vector and a motion compensated prediction error associated with one of the plurality of arbitrarily-shaped regions are encoded. A third mode is an intra-frame mode in which the intensity of each pel in one of the plurality of arbitrarily-shaped regions is encoded. A mode coding unit then encodes the mode in which each of the plurality of arbitrarily-shaped regions is to be encoded.

The encoder includes a motion coding unit for encoding motion vectors associated with the plurality of arbitrarily-shaped regions. In addition, the encoder comprises a region interior coder which encodes a motion compensated prediction error associated with one of the plurality of arbitrarily-shaped regions if the region is to be encoded in the second inter-frame mode, and which encodes the intensity of each pel in one of the plurality of arbitrarily-shaped regions if the region is to be encoded in the intra-frame mode.

A buffer serves as an interface for transmitting encoded information between the encoder and a transmission or storage medium. Finally, a rate controller receives signals from the buffer. The rate controller then sends control signals to the segmentation unit, the mode decision unit, the region interior unit and a frame skip unit in response to the signals received from the buffer.

Other features and advantages of the present invention will be readily apparent by reference to the following detailed description and accompanying drawings.

DETAILED DESCRIPTION OF THE PRESENT INVENTION

Figure 1:
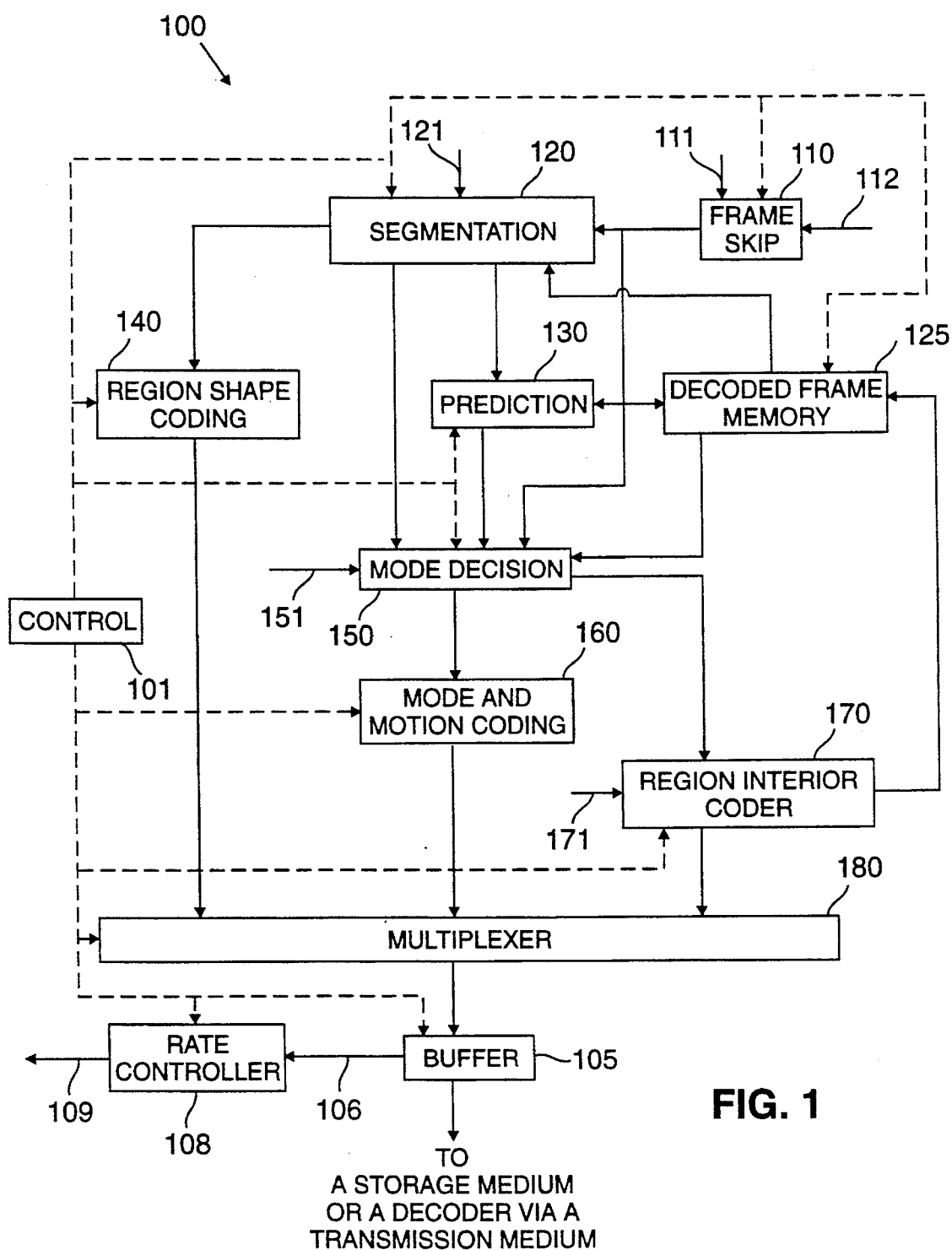
FIG. 1 is a block diagram of an encoder for performing motion estimation, segmentation and coding of a video sequence with regions of arbitrary shape and size.

FIG. 1 is a block diagram of an encoder 100 for performing motion estimation, segmentation and coding of a video sequence with regions of arbitrary shape and size. The encoder 100 has a buffer 105 which serves as an interface between the encoder 100 and a transmission or storage medium. The buffer 105 sends signals to a rate controller 108 via line 106 indicating the fullness of the buffer 105. In response to the signals received from the buffer 105, the rate controller 108 controls the rate of flow of information from the encoder 100 to the transmission or storage medium by providing control signals to other components of the encoder 100 via line 109. The encoder 100 further has a frame skip unit 110 for receiving a sequence of digital video frames one at a time from an input line 112 and for determining whether a particular frame in the sequence should be skipped.

A segmentation unit 120 is included in the encoder 100 for segmenting a frame into a plurality of regions of arbitrary shape and size. The segmentation unit 120 also determines a motion vector associated with each region for predicting the current frame from a previous decoded frame which may be stored in a decoded frame memory unit 125. Details of the segmentation unit 120 are provided below. The encoder 100 comprises a prediction unit 130 for predicting a region of the current frame based upon a motion vector received from the segmentation unit 120 and a previous decoded frame received from the decoded frame memory unit 125.

A region shape coding unit 140 is also included in the encoder 100 for encoding the shape of each region of the current frame. The encoder 100 further comprises a mode decision unit 150 for deciding in which of three modes image data of a region will be coded and transmitted. These three modes are discussed in greater detail below. A mode and motion vector coding unit 160 is included in the encoder 100 for encoding the particular mode in which the information about a region will be sent and for encoding the motion vector associated with the region. Although shown as a single unit in FIG. 1, the mode and motion unit 160 may comprise separate units for performing the functions of encoding the mode and encoding the motion vector. Similarly, a region interior coder 170, described more fully below, is included for encoding either the prediction error or the intensity value of a particular region depending upon the mode in which the region is to be encoded. The encoder 100 also has a multiplexer 180 for passing the encoded information from the various coding units 140, 160 and 170 to the buffer 105 in a predefined order. Finally, a control unit 101 is connected to the other units so as to control the interaction and flow of information between the other units of the encoder 100. The control unit 101 may be, for example, a suitably programmed microprocessor or other suitably configured hardware, as well as implemented in software.

Figure 2:
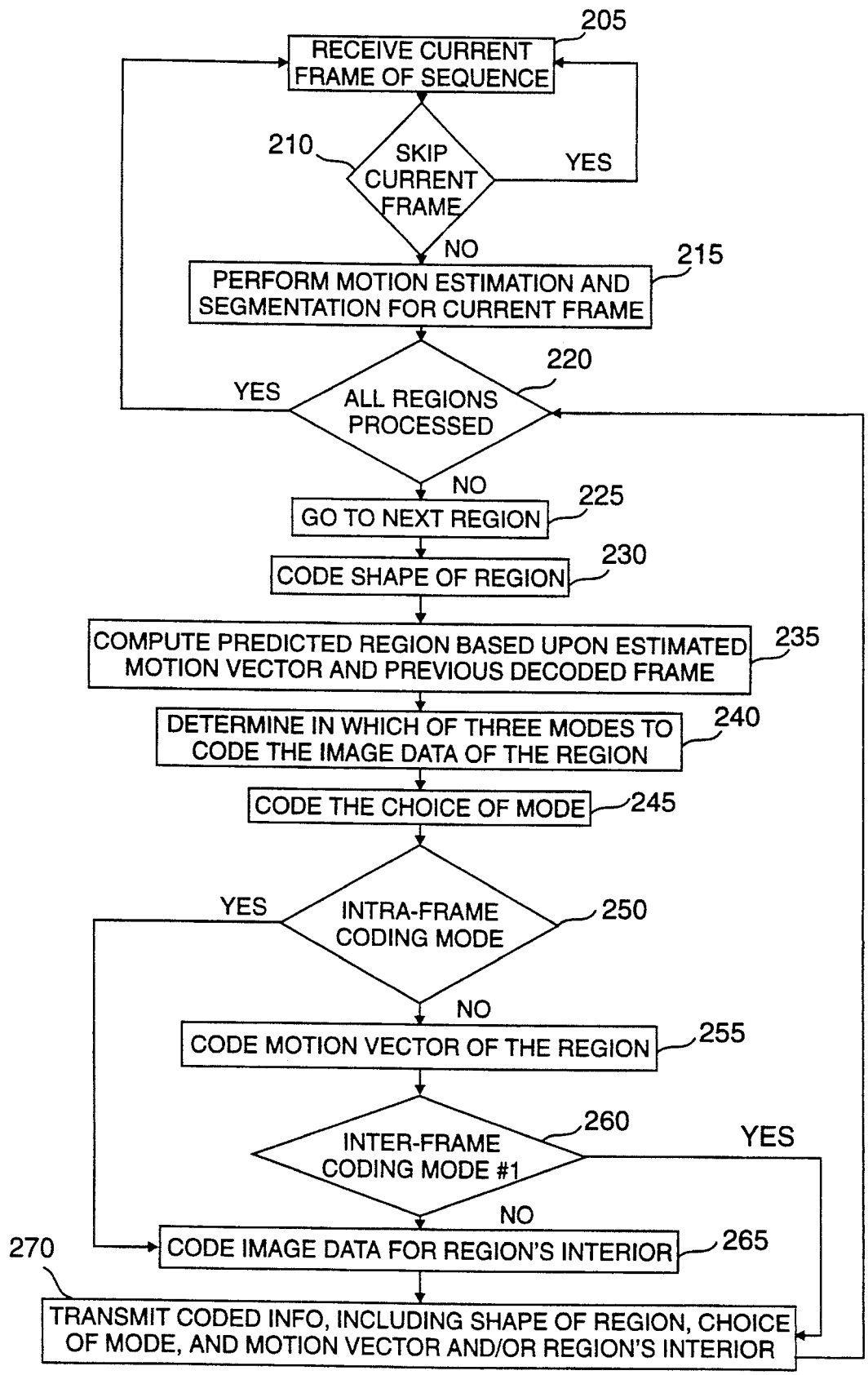
FIG. 2 is a flow chart showing steps of the image coding method according to the principles of the present invention

FIG. 2 is a flow chart showing steps of the image coding method according to the principles of the present invention. As shown in step 205, a current frame in a sequence of frames is received by the frame skip unit 110 via line 112. The frame skip unit 110 determines whether the current frame should be skipped or not, as shown in 210. The decision whether to skip the current frame is determined, for example, by a control signal received on line 111 from the rate controller 108, which receives and processes information from the buffer 105 via line 106 indicating the fullness of the buffer. If the current frame is skipped, then the next frame in the sequence is received by returning to step 205.

If the current frame is not skipped, then, as indicated by step 215, the current frame is segmented or divided into a plurality of regions each having a motion vector associated with it. In particular, the regions may be of a shape and size which is not known a priori, thereby resulting in arbitrarily-shaped regions. The current frame is divided into regions by grouping or merging together adjacent pels having the same or a similar intensity or by grouping together adjacent pels having the same or a similar motion vector. The number of regions into which the frame is divided may be limited or controlled by a control signal on line 121 received from the rate controller 108. In order to determine the motion vector for each region, the segmentation unit 120 receives the previous decoded frame from the memory unit 125 as an input.

The output of the segmentation unit 120 includes a description indicating the region to which each pel in the frame belongs and an array indicating the motion vector assigned to each region. Once a frame has been segmented into a plurality of regions, and a motion vector has been assigned to each region, each region is processed until all the regions have been processed as indicated by step 220. If all the regions in the current frame have been processed and coded, then the next frame is received in step 205. If all the regions in the current frame have not been processed and coded, then the process continues to process and code the next region as shown in step 225.

As shown in step 230, the shape of each region is coded by the region shape coding unit 140. For this purpose, the region shape coding unit 140 receives from the segmentation unit 120 a description indicating the region to which each pel in the frame belongs. This description may be, for example, a simple array of region labels, a binary array of boundaries, a series of chain codes, a tree, or any other suitable segmentation representation. The shape coding unit 140 encodes this description according to any one of a number of lossless coding techniques, such as arithmetic coding. It should be noted that the step of encoding the shape of the arbitrarily-shaped regions may be performed prior to step 220.

Next, as shown in step 235, a predicted region is computed based upon the motion vector assigned to the current region. The predicted region is computed in the prediction unit 130 which receives from the memory unit 125 the previous decoded frame. The description indicating the region to which each pel in the frame belongs and the array indicating the motion vector assigned to each region are sent from the segmentation unit 120 to the prediction unit 130 as well.

In step 240, the mode decision unit 150 determines in which one of at least three modes the image data of each region is to be coded and transmitted. The first of the three possible modes is an inter-frame motion compensated mode in which the motion vector associated with a particular region is encoded. In this first mode, no prediction error is encoded. A decoder then would recover the image of the region by using a previous decoded frame and the motion vector. The second mode is also inter-frame motion compensated. A motion compensated prediction error for each pel in the region, however, is also encoded along with the motion vector in order to improve the quality of the image intensity in the region. The prediction error represents the difference between the current image segment and the motion compensated segment obtained from the prediction unit 130. The third mode is an intra-frame mode in which the image data in the region is treated independently of previously decoded or reconstructed frames. From the standpoint of minimizing the amount of coded information generated by the encoder 100, the first mode is preferred because it is likely to require the least amount of information to be coded. On the other hand, the inter-frame motion compensated modes may result in excessive noise or may fail to accurately predict a region in the current frame under certain circumstances. In such situations, it is necessary to encode the intensity, in other words, the luminance and chrominance, of each pel in the region.

In one embodiment, the decision to code the image data in a particular mode may depend, for example, upon the calculated values of the following two normalized sums of absolute differences for the region under consideration:

$$NSAD_I = \frac{1}{N} \sum_{i \in R} |I_i - m|$$

$$NSAD_P = \frac{1}{N} \sum_{i \in R} |e_i|$$

where N is the total number of pels in the region, i is a given pel in the region, and R is the set of all the pels in the region. Also, in the above equations, $I_i$ is the intensity of the particular pel i, m is the mean value of the intensity of all the pels in the region, and $e_i$ designates the motion compensated prediction error associated with the pel i. For the above purposes, the mode decision unit 150 receives the same segmentation and motion information that is sent to the prediction unit 130. In addition, the mode decision unit 150 receives the current frame from the frame skip unit 110 and a predicted region from the prediction unit 130.

Figure 3:
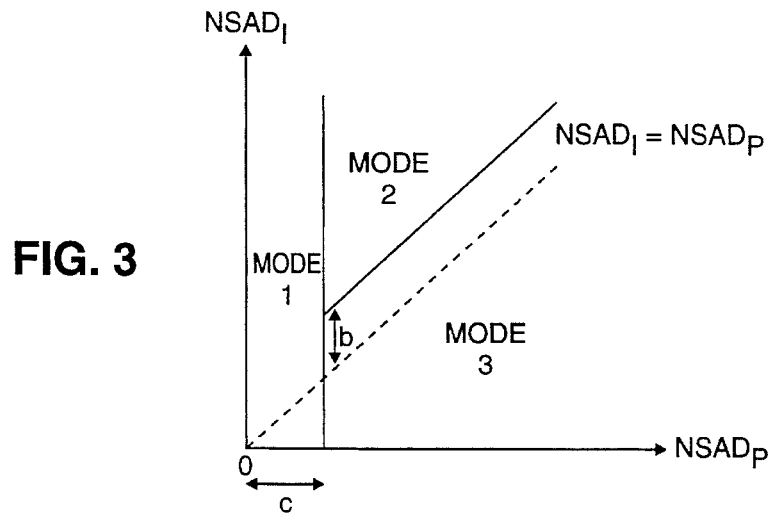
FIG. 3 is an exemplary graph for use in determining the mode in which the coded image data is to be sent.

FIG. 3 is an exemplary graph plotting the values of $NSAD_P$ versus $NSAD_I$ for use in determining the mode in which the coded image data is to be sent. The graph is divided by the solid lines into three sections corresponding to the three modes. When the value of $NSAD_P$ is less than a threshold value c, then the image data is coded and transmitted in the first mode. When the value of $NSAD_P$ exceeds the threshold value c and is less than the value of $NSAD_I$ by at least a threshold value of b, then the image data is coded and transmitted in the second mode. Otherwise, the image data is coded and transmitted in the third mode. The value of b is, therefore, chosen to distribute the coded regions between the intra-frame mode and the second inter-frame mode. The value of c is chosen to control the number of regions which are to be coded in the first inter-frame motion compensated mode. The values of b and c depend upon the noise present in the frame and the status of the rate control unit 108. For this purpose, for example, a control signal may be received on line 151 from the rate controller 108. Once the mode has been determined, the choice of the mode is encoded, for example, in binary code by the mode coding unit 160, as indicated in step 245.

It should be noted that there may be other modes different from or in addition to the three modes discussed above. Also, each of the three modes discussed above may permit or require other parameter choices to be made, thereby resulting in secondary modes. For example, a quantization step size, discussed further below in the context of the region interior coder 170, may be adjustable. The setting of such parameters or secondary modes would also be encoded by the mode decision unit.

The next step depends upon whether the intra-frame coding mode was selected for the region under consideration, as shown by 250. If the intra-frame coding mode was not selected, then the motion vector of the region is also coded by the coding unit 160 as indicated in step 255. The next step depends upon whether the first inter-frame motion compensated mode was selected as shown in 260. If the first inter-frame motion compensated mode was not selected, then, as indicated in step 265, the image data for the region's interior is coded by the region interior coder 170. As explained above, the interior coding for the inter-frame motion compensated mode using prediction errors requires that a prediction error for each pel in the region under consideration be coded and transmitted. In contrast, the interior coding for the intra-frame mode requires that the intensity of each pel in the region be coded and transmitted. Details of the region interior coder 170 and the step of coding the image data for the region's interior are explained in greater detail below.

The coded information for the region under consideration, including the shape of the region, the choice of mode, and the motion vector and/or the image data for the region's interior, is then transmitted via the multiplexer 180 and the buffer 105 to a decoder via a transmission medium as indicated in step 270. Alternatively, the coded information may be stored in a suitable storage medium, such as a CD-ROM, for subsequent decoding at a decoder. The steps 230 through 270 are performed for each region until all the regions in the current frame have been coded and transmitted. The decoder can then use the coded information to reconstruct the current frame.

Figure 4:
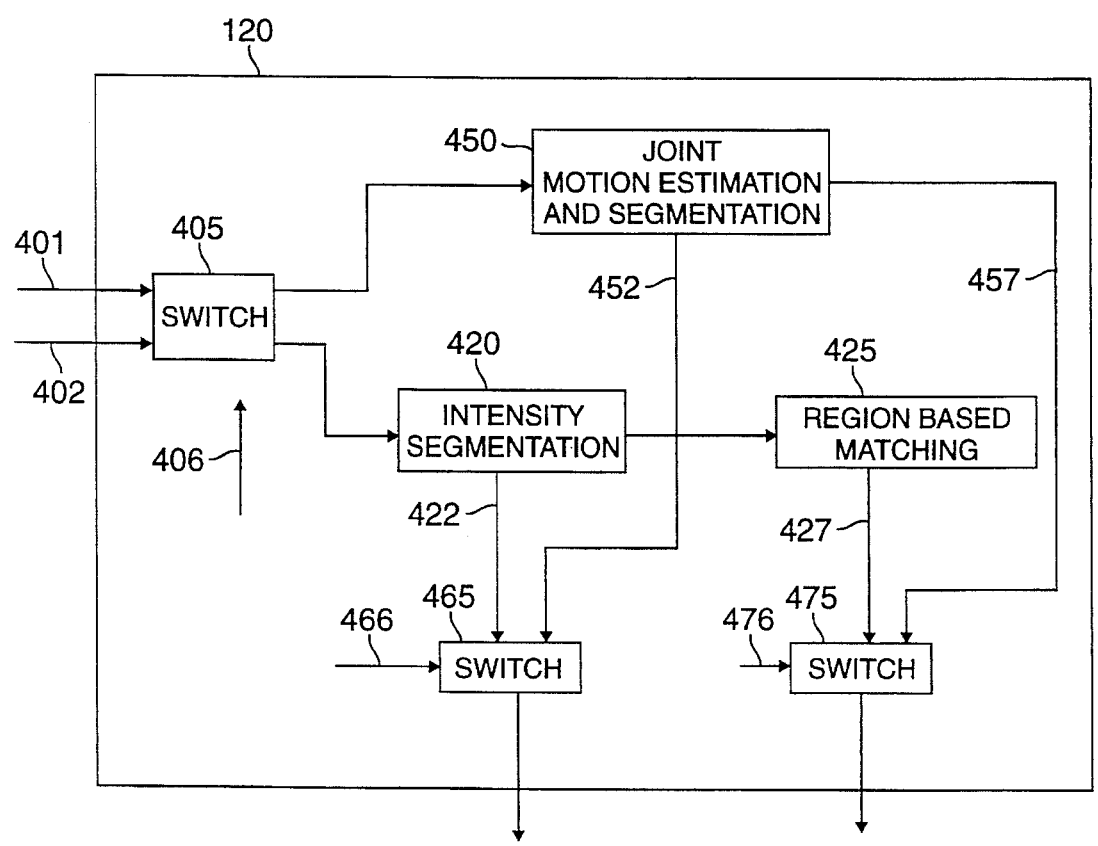
FIG. 4 depicts a preferred embodiment of a motion estimation and segmentation unit for use in the encoder in FIG. 1.

FIG. 4 depicts a preferred embodiment of the segmentation unit 120. The unit 120 receives the current frame and the previous decoded frame from the frame skip unit 110 and the decoded frame memory unit 125 via lines 401 and 402, respectively. The received current frame and previous decoded frame data is routed, in response to a first control signal on line 406, to an intensity segmentation unit 420 via a switch 405. Alternatively, the received current frame and previous decoded frame data is routed, in response to a second control signal on line 406, to a joint motion estimation and segmentation unit 450 via the switch 405. The first and second control signals are generated by the control unit 101. The intensity segmentation unit 420 divides the current frame into a plurality of arbitrarily-shaped intensity regions by grouping together pels that have the same or similar intensity features. The initial frame in a sequence of images, for example, is always sent to the intensity segmentation unit 420 and coded in the intra-frame mode because motion estimation and segmentation is not applicable when there is no previous decoded frame. A description indicating the region to which each pel in the frame belongs is sent via lead 422 to a switch 465. The switch 465 is also controlled by a control signal on line 466 that allows the information indicating the region to which each pel in the frame belongs to pass from the intensity segmentation 420 or the joint motion estimation unit 450 to the other units in the encoder 100 depending upon which unit, 450 or 420, received the current frame. In other words, the control signal on line 466 is synchronized with the control signal on line 406. The information indicating the region to which each pel in the frame belongs may then be sent to the region shape coding unit 140, the prediction unit 130 and the mode decision unit 150.

Other frames may also be selected and segmented by the intensity segmentation unit 420 and sent in the intra-frame mode. If, for example, a scene change occurs which results in objects or image areas that did not appear in previous frames, a decision is made to send the frame to the intensity segmentation unit 420. Similarly, in order to ease editing of the sequence at some later time, periodic frames, such as one frame every few seconds, may be segmented by the intensity segmentation unit 420. In addition, a particular frame may be segmented by the intensity segmentation unit 420 to resynchronize the encoder 100 and the decoder.

The inter-frame modes can also be performed by the use of the intensity segmentation unit 420. In such a situation, a motion vector is determined for each region in a region based matching unit 425 using a region matching technique similar to well-known block matching techniques employed with rectangular or square regions. In other words, each region is compared to the previous decoded frame, and a best match is found which minimizes the total prediction error for the region. A motion vector then is used to indicate the relative difference in position between the current region and the matched region in the previous decoded frame. The motion vectors are then sent, via line 427, to a switch 475. The switch 475 is also controlled by a control signal on line 476 that allows the motion vector assigned to each region to pass from the intensity segmentation unit 420 or the joint motion estimation and segmentation unit 450 to the other components in the encoder 100 depending upon which unit, 450 or 420, received the current frame. The control signal on line 476 is, therefore, also synchronized with the control signals on lines 406 and 466. The control signals on lines 466 and 476 are also sent from the control unit 101 and allow image data to pass from the intensity segmentation unit 420 and the joint motion estimation and segmentation unit 450 to other units in the encoder 100 as explained above. The information indicating the motion vector associated with each region in the frame is sent to the prediction unit 130 and the mode decision unit 150.

Typically, however, frames other than the initial frame in the sequence are segmented by the joint motion estimation and segmentation unit 450. In a preferred embodiment, the joint motion estimation and segmentation unit 450 divides a current frame into a plurality of regions and assigns a motion vector to each region according to the method and apparatus described in U.S. patent application Ser. No. 08/271,308, entitled "Method and Apparatus For Motion Field Estimation, Segmentation and Coding," which is assigned to the assignee of the present invention and which is incorporated by reference herein. The motion estimation and segmentation technique described in the aforementioned application uses a hierarchical approach in which a frame is divided into a plurality of regions, and in which a motion vector updating routine is performed with respect to multiple levels of smaller and smaller regions. In a preferred embodiment, the motion vector updating routine is performed with respect to smaller and smaller square blocks of predetermined size. The motion vector updating routine updates the motion vector of each smaller block by assigning to it a best motion vector selected from among an initial motion vector assigned to the smaller block, motion vectors of neighboring blocks, and an updated or matched motion vector obtained by performing a block matching technique for the smaller block. The initial motion vector assigned to blocks in the first segmentation level is typically zero, whereas the initial motion vector assigned to each block in subsequent segmentation levels is the motion vector of its parent block from which it was obtained. The best motion vector for each block is selected according to a priority scheme and a predetermined threshold value.

Figure 5:
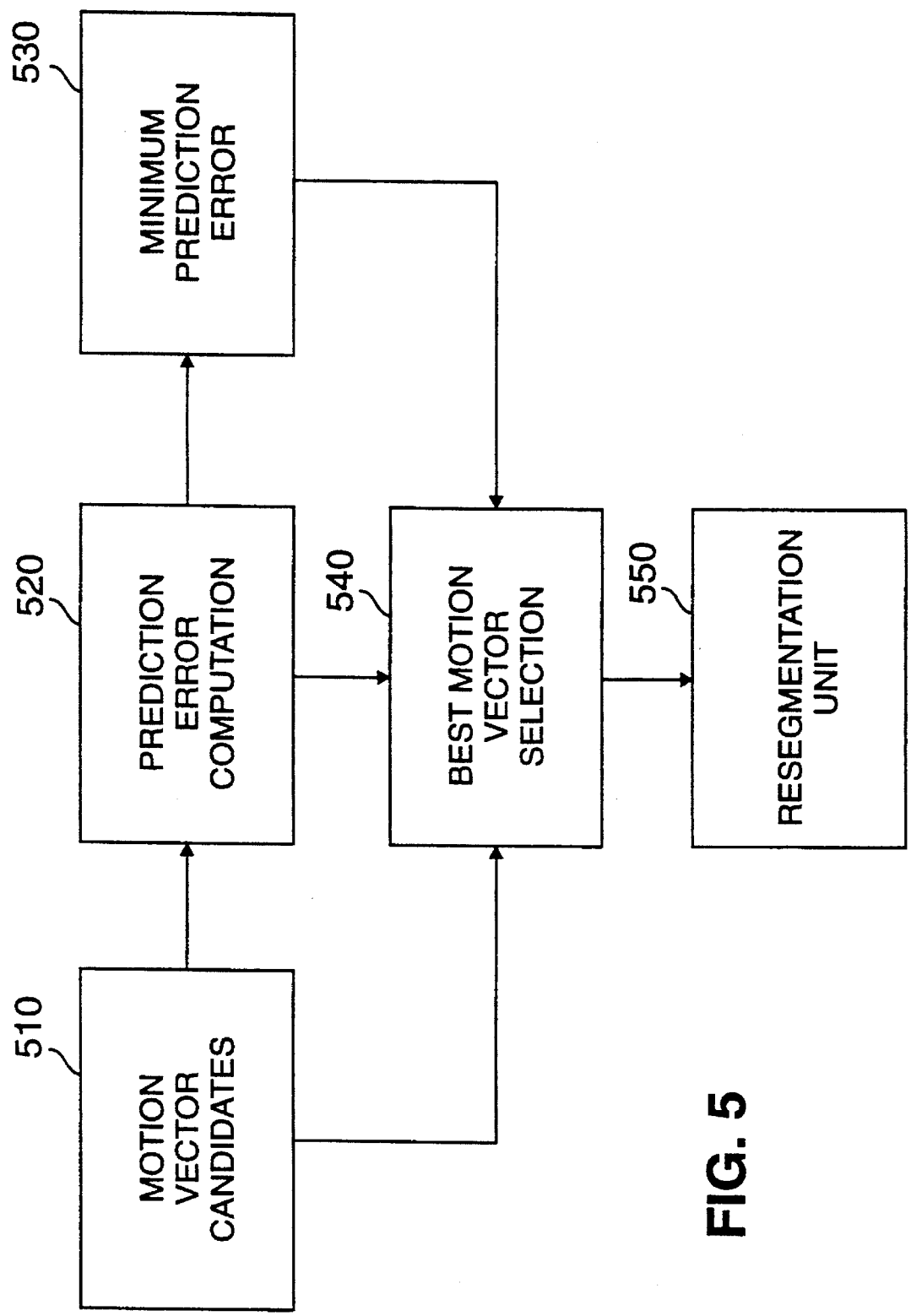
FIG. 5 is a simplified block diagram showing one embodiment of a joint motion estimation and segmentation unit for generating arbitrarily-shaped regions with corresponding motion vectors.

FIG. 5 is a simplified block diagram showing the joint motion estimation and segmentation unit 450 that is used for determining the best motion vector associated with each square block and for generating the arbitrarily-shaped regions having corresponding motion vectors. A motion vector candidate unit 510 computes and stores motion vectors that serve as candidates for the best motion vector associated with a particular square block. These motion vectors include the initial motion vector (PV) assigned to the block, the motion vectors (V0 through V7) of up to eight neighboring blocks, and the updated motion vector (NV) obtained by performing a block matching technique for the block. A prediction error computation unit 520 computes and stores the motion compensated prediction or matching error corresponding to each of the candidate motion vectors. A minimum prediction error unit 530 determines the smallest prediction error (MIN) from among the prediction errors computed by the prediction error unit 520. The motion vector candidates, the corresponding prediction errors, and the minimum predicted error then are sent to a best motion vector selection unit 540 which selects the best motion vector for the block under consideration.

A basic idea behind the selection of the best motion vector for each block, according to the technique disclosed in the aforementioned patent application Ser. No. 08/271,308, is to substitute the motion vector of one of the neighboring blocks or an updated motion vector obtained by the block matching technique for the current block only if such a substitution yields a significant improvement in the matching or prediction error for that block. Furthermore, there is a preference for the motion vectors of the neighboring blocks relative to the updated motion vector of the current block obtained from the block matching technique.

Figure 6:
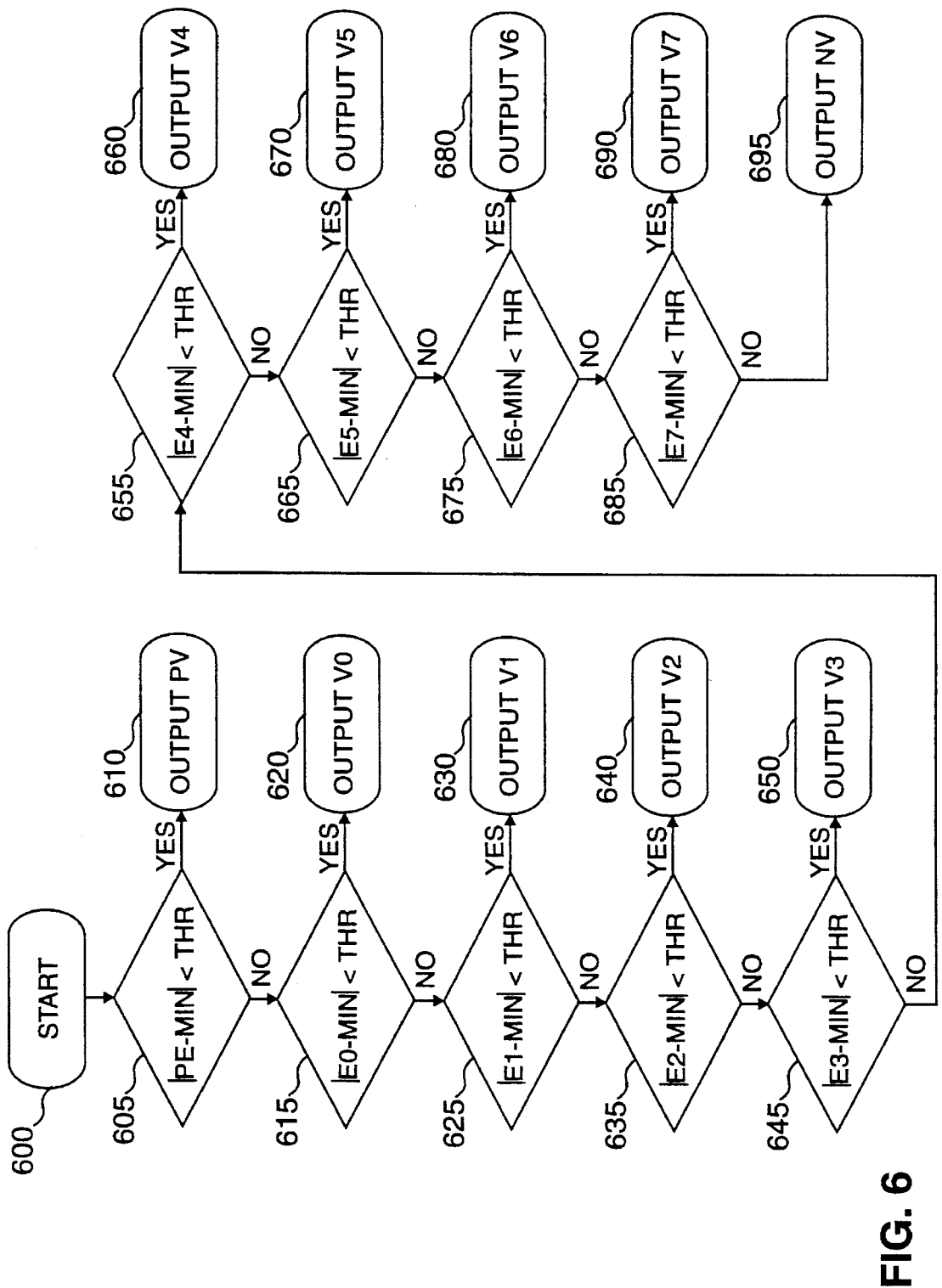
FIG. 6 is a flow chart showing the steps for selecting a best motion vector for a square block.

FIG. 6 shows an exemplary process, starting in step 600, by which the best motion vector is selected by the best motion vector selection unit 540 for a block which has, for example, eight neighboring blocks. In FIG. 6, PE, and E0 through E7 refer, respectively, to the prediction errors that result from assigning the motion vectors PV, and V0 through V7 to the block under consideration. In step 605, it is determined whether the absolute difference between the prediction error (PE) and the smallest prediction error (MIN) is less than a predetermined threshold (THR). If the absolute value in step 605 is less than the threshold value, this determination serves as an indication that substituting any one of the motion vectors V0 through V7, or NV, would not result in a significant improvement in the prediction error. As indicated by step 610, the motion vector PV is, therefore, selected as the best motion vector for the block under consideration.

If, however, the absolute difference determined in step 605 is not less than THR, then the process continues with step 615. In each of steps 615, 625, 635, 645, 655, 665, 675 and 685, it is determined whether the absolute difference between MIN and a respective one of the prediction errors E0 through E7 is less than THR. If the absolute difference in a particular step is less than THR, then the motion vector corresponding to the particular prediction error is selected as the best motion vector as indicated by steps 620, 630, 640,

650, 660, 670, 680 and 690, respectively. The steps 615, 625, 635, 645, 655, 665, 675 and 685, are performed sequentially until a best motion vector is selected. If none of the aforementioned absolute differences is less than THR, then, as shown by step 695, this determination indicates that NV should be used as the best motion vector for the block under consideration.

Once a best motion vector is obtained for each square block of the current frame, each square block is segmented into four smaller square blocks of equal size, and the motion vector updating routine is repeated for each smaller block until a stop condition is reached. The stop condition may be, for example, a lower limit on the size of the blocks for which the motion vector updating routine is performed or a predetermined number of cycles of the motion vector updating routine.

When the stop condition is reached, and a best motion vector has been assigned to each square block in the current segmentation level, a resegmentation unit 550 performs a merging process which merges adjacent square regions having the same or similar motion vectors to form a set of non-overlapping merged regions, each of which may be arbitrarily-shaped and have different dimensions. It should be understood that, in some applications, some or all of the arbitrarily-shaped regions that result from the merging process may be square blocks having the same or different dimensions.

The resegmentation unit 550 also assigns to each pel in the current frame a region label indicating to which region it belongs. The region labels are then sent via line 452 to the switch 465, and the motion vectors associated with each region are sent via line 457 to the switch 475. As explained above, control signals on lines 466 and 476 allow the region labels and motion vectors to pass to other components of the encoder 100 for further processing and encoding.

In a preferred embodiment of the present invention, the region interior coder 170 of the encoder 100 implements, for example, the method described in U.S. patent application Ser. No. 08/138,295, entitled "Block Transform Coder For Arbitrarily Shaped Image Segments," which is assigned to the assignee of the present invention, and which is incorporated by reference herein. The method described in application Ser. No. 08/138,295 uses block transforms with frequency domain region-zeroing and space domain region-enforcing operations for effectively coding the image data of arbitrarily-shaped regions. The method uses an iterative technique based on the theory of successive projection onto convex sets (POCS) to find the best values for a group of selected transform coefficients.

Figure 7:
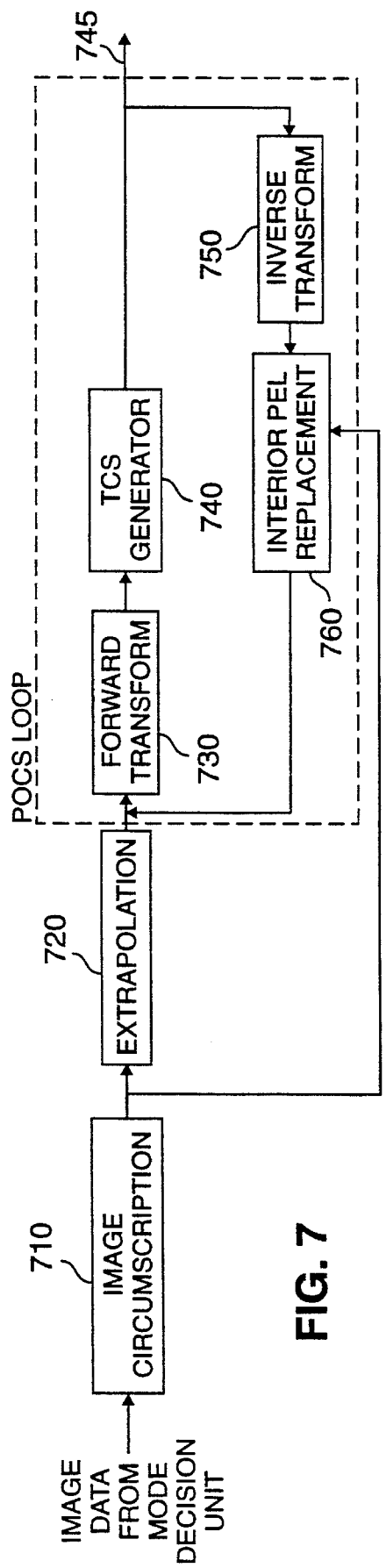
FIG. 7 shows a simplified block diagram of a region interior coder for use in the encoder in FIG. 1.
Figure 8:
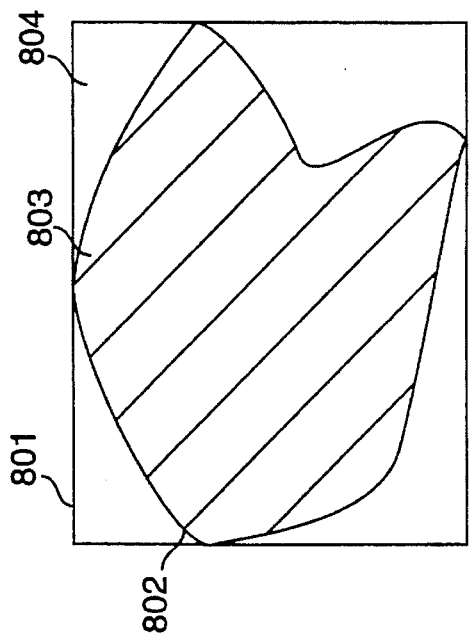
FIG. 8 illustrates an exemplary arbitrarily-shaped region circumscribed by a rectangular block.

A simplified block diagram of an exemplary region interior coder 170 for implementing the aforementioned iterative POCS technique is depicted in FIG. 7. An image circumscription unit 710 receives the image data of an arbitrarily-shaped region 802 from the mode decision unit 150. As shown in FIG. 8, a rectangular region block 801 is circumscribed around the arbitrarily-shaped region 802. An original internal pel set 803 which lies within the arbitrarily-shaped region 802 is thereby defined. Similarly, an original external pel set 804 which lies outside the arbitrarily-shaped region 802 and within the region block 801 is thereby defined. An extrapolator 720 extrapolates the pel values of the internal pel set 803 to initialize the pel values of the external pel set 804. Examples of extrapolation methods include pel repetition, mirroring and morphological dilations.

Other components of the transform coder 170 shown in FIG. 7 perform a POCS iteration loop on the image data. It should be understood that the image data upon which the POCS iteration loop is performed depends upon the mode in which the image data of the region is to be coded, and transmitted or stored. In the second inter-frame motion compensated mode in which the prediction errors are coded, the image data coded by the POCS iteration loop is the prediction error associated with the pels in the region under consideration. If, on the other hand, the intra-frame mode is to be used, then the image data coded by the POCS iteration loop includes the intensity of each pel in the region under consideration.

The POCS iteration loop begins with the application of a forward transform, such as the discrete cosine transform (DCT), by a forward transform unit 730 to generate transform coefficients. A transform coefficient set (TCS) is generated by a TCS generator 740 which selects and retains transform coefficients having high energy according to the energy compaction property of transform coefficients. The remaining transform coefficients are set to zero. The number of selected coefficients is determined by the rate controller 108 which establishes a threshold energy based, for example, upon the size of the arbitrarily-shaped region. Next, an inverse transform unit 750 performs an inverse transform on the TCS to generate a computed region block having computed pel values. An interior pel replacement unit 760 replaces those computed pels corresponding to the internal pel set with original pel values to form a modified computed region block. A forward transform is again performed on the modified computed region block (MCRB), and a new transform coefficient set is generated.

If a particular transform coefficient set (TCS) represents optimal transform coefficients (OTC), then the TCS is quantized and coded using, for example, variable length coding. The step size of quantization may be determined, for example, by a signal on line 171 received from the rate controller 108. The coded, quantized values of the optimal transform coefficients are then sent as outputs to the multiplexer 180. A particular TCS may represent optimal transform coefficients when a predetermined number of POCS loop iterations is reached, when the exterior pels do not change, or when the mean squared difference of the exterior pels between iterations is within a pre-defined threshold. If the TCS does not represent the optimal transform coefficients, then the POCS loop is reiterated until optimal transform coefficients are obtained. At the decoded frame memory unit 125 or at a decoder, an inverse quantization process and inverse transform process is applied to reconstruct the image data for the region prior to storing the decoded region.

The region-based video encoder 100 of the present invention is particularly advantageous for systems using low bit-rates. Communication applications include, for example, video telephony, personal communication, multimedia, education, entertainment and remote sensing where the transmission or storage capacity of the system is limited.

Although the present invention has been described with reference to specific embodiments, it will be appreciated that other arrangements within the spirit and scope of present invention will be readily apparent to persons of ordinary skill in the art. The present invention is, therefore, limited only by the appended claims.

We claim:

1. An encoder for encoding a sequence of video frames comprising:

a segmentation unit which segments a current frame in said video sequence into a plurality of arbitrarily-shaped regions which may have different dimensions, each of said plurality of arbitrarily-shaped regions being assigned a motion vector;

a decoded frame memory for storing a previously decoded frame in said video sequence;

a prediction unit connected to said segmentation unit and said decoded frame memory for predicting image data of said current frame based upon a previously decoded frame and based upon the motion vector assigned to one of said plurality of arbitrarily-shaped regions;

a region shape coding unit for encoding the shape of each of said arbitrarily-shaped regions;

a mode decision unit which determines in which one of a plurality of modes image data from each of said plurality of arbitrarily-shaped regions is to be encoded, where said plurality of modes comprises an intra-frame mode in which the intensity of each pel in one of said plurality of arbitrarily-shaped regions is encoded;

a mode coding unit which encodes the mode in which each of said plurality of arbitrarily-shaped regions is to be encoded;

a motion coding unit for encoding motion vectors associated with said plurality of arbitrarily-shaped regions;

a region interior coder which encodes the intensity of each pel in one of said plurality of arbitrarily-shaped regions if the region is to be encoded in said intra-frame mode;

a buffer which serves as an interface for transmitting encoded information from said encoder; and a rate controller which receives signals from said buffer, where said rate controller sends control signals to said segmentation unit, said mode decision unit, and said region interior unit in response to the signals received from said buffer.

2. The encoder of claim 1 wherein said plurality of modes further comprises a first inter-frame mode in which a motion vector associated with one of said plurality of arbitrarily-shaped regions is encoded and a second inter-frame mode in which a motion vector and a motion compensated prediction error associated with one of said plurality of arbitrarily-shaped regions are encoded; and said region interior coder encodes a motion compensated prediction error associated with one of said plurality of arbitrarily-shaped regions if the region is to be encoded in said second inter-frame mode.

3. The encoder of claim 1 wherein said segmentation unit comprises a joint motion estimation and segmentation unit for performing the following functions:

(a) dividing said current frame into a plurality of smaller regions of predetermined shape and size;

(b) performing for each of said smaller regions a motion vector updating routine by assigning to the smaller region a best motion vector selected from among an initial motion vector assigned to the smaller region, motion vectors of neighboring regions, and an updated motion vector obtained by performing a block matching technique for the smaller region, wherein the best motion vector is selected according to a priority scheme and a predetermined threshold value;

(c) dividing each of said smaller regions into a plurality of smaller regions of predetermined shape and size;

(d) repeating step (b) for each of the smaller regions resulting from step (c);

(e) iteratively repeating steps (c) and (d) for each smaller region resulting from step (d) until a stop condition is reached; and (f) merging adjacent regions having similar motion vectors to form said arbitrarily-shaped regions.

4. The encoder of claim 3 wherein said joint motion estimation and segmentation unit comprises a best motion vector selection unit which performs the following functions:

determining the smallest matching error from among the matching errors obtained respectively by assigning to the smaller region the following motion vectors:
(a) the initial motion vector assigned to the smaller region;
(b) the updated motion vector obtained by performing a block matching technique for the smaller region; and
(c) the motion vectors of the smaller region's neighboring regions;

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:
(a) the absolute value of the difference between the smallest matching error and the matching error obtained by using the initial motion vector is not less than the predetermined threshold value; and
(b) the absolute value of the difference between the smallest matching error and the matching error obtained by assigning to the smaller region the motion vector of the neighboring region is less than the predetermined threshold value; and selecting the matched motion vector as the best motion vector if:
(a) the absolute value of the difference between the smallest matching error and the matching error obtained by using the initial motion vector is not less than the predetermined threshold value; and
(b) the absolute value of the difference between the smallest matching error and each of the matching errors obtained by assigning to the smaller region the motion vector of one of the neighboring region is not less than the predetermined threshold value.

5. The encoder of claim 3 wherein the step of dividing each of said smaller regions into a plurality of smaller regions comprises the step of dividing each of said smaller regions into four smaller square blocks of equal size.

6. The encoder of claim 5 wherein said region interior coder uses an iterative technique with frequency domain region-zeroing and space domain region-enforcing operations to transform an arbitrarily-shaped image into optimal transform coefficients (OTC).

7. The encoder of claim 6 wherein said region interior coder comprises:

an image circumscription unit for receiving image data of an arbitrarily-shaped region, and circumscribing a rectangular block around said arbitrarily-shaped region, thereby defining an original internal pel set and an original external pel set;

an extrapolator which extrapolates pel values of said internal pel set to initialize pel values of said external pel set;

a forward transform which transforms said image to transform coefficients;

a TCS generator which generates a transform coefficient set (TCS) from said transform coefficients, said TCS generator outputs said TCS when said TCS represents said OTC, and sends said TCS to an inverse transform when said TCS does not represent said OTC;

an inverse transform which transforms said TCS to a computed region block having computed pel values; and a replacer which replaces those computed pel values corresponding to said interior pel set with said original pel values to form a modified computed region block (MCRB), said replacer sends the modified computed region block to the forward transform for re-iteration.

8. The encoder of claim 7 wherein said TCS generator generates said TCS by selecting an retaining those transform coefficients which have high energy according to the energy compaction property of transform coefficients, and by zeroing all the non-selected transform coefficients.

9. The encoder of claim 8 further comprising a frame skip unit which receives said sequence of frames and which determines whether each frame in said sequence should be skipped.

10. The encoder of claim 9 further comprising a multiplexer for passing encoded information from said region shape coding unit, said mode coding unit, said motion coding unit, and said region interior coder to said buffer in a predefined order.

11. The encoder of claim 2 wherein said mode decision unit determines in which one of said plurality of modes to encode image data of a particular one of said arbitrarily-shaped regions based upon the values of the following normalized sums of absolute differences for the particular region:

$$NSAD_I = \frac{1}{N} \sum_{i \in R} |I_i - m|$$

$$NSAD_P = \frac{1}{N} \sum_{i \in R} |e_i|$$

where N is the total number of pels in the particular region, i is a given pel in the region, R is the set of all pels in the particular region, $I_i$ is the intensity of the given pel i, m is the mean value of the intensity of all the pels in the particular region, and $e_i$ designates the motion compensated prediction error associated with the given pel i.

12. The encoder of claim 3 wherein said segmentation unit further comprises:

an intensity segmentation unit which divides a frame into a plurality of arbitrarily-shaped intensity regions by grouping together pels that have a similar intensity features;

a region based matching unit for determining a motion vector indicating the relative difference in position between one of said plurality of intensity regions and a matched region in a previously decoded frame;

a switch for sending a received frame to said intensity segmentation unit in response to a first control signal and to said joint motion estimation and segmentation unit in response to a second control signal; and a plurality of switches that allow image data information to pass from said intensity segmentation unit and said joint motion estimation and segmentation unit to other of said units in said encoder in response to control signals synchronized with said first and second control signals, respectively.

13. The encoder of claim 1 wherein said region interior coder uses an iterative technique with frequency domain region-zeroing and space domain region-enforcing operations to transform an arbitrarily-shaped image into optimal transform coefficients (OTC).

14. The encoder of claim 13 wherein said region interior coder comprises:

an image circumscription unit for receiving image data of an arbitrarily-shaped region, and circumscribing a rectangular block around said arbitrarily-shaped region, thereby defining an original internal pel set and an original external pel set;

an extrapolator which extrapolates pel values of said internal pel set to initialize pel values of said external pel set;

a forward transform which transforms said image to transform coefficients;

a TCS generator which generates a transform coefficient set (TCS) from said transform coefficients, said TCS generator outputs said TCS when said TCS represents said OTC, and sends said TCS to an inverse transform when said TCS does not represent said OTC;

an inverse transform which transforms said TCS to a computed region block having computed pel values; and a replacer which replaces those computed pel values corresponding to said interior pel set with said original pel values to form a modified computed region block (MCRB), said replacer sends the modified computed region block to the forward transform for re-iteration.

15. The encoder of claim 1 further comprising a frame skip unit which receives said sequence of frames and which determines whether each frame in said sequence should be skipped.

16. The encoder of claim 15 further comprising a multiplexer for passing encoded information from said region shape coding unit, said mode coding unit, said motion coding unit, and said region interior coder to said buffer in a predefined order.

17. The encoder of claim 15 wherein said rate controller sends control signals to said frame skip unit in response to the signals received from said buffer.

18. A method of encoding a frame in a video sequence comprising the steps of:

(a) segmenting the frame into a plurality of arbitrarily-shaped regions which may have different dimensions, each having a corresponding motion vector;

(b) encoding the shape of each arbitrarily-shaped region;

(c) determining in which of a plurality of modes image data of each arbitrarily-shaped region is to be encoded, where said plurality of modes includes a first mode in which the motion vector corresponding to an arbitrarily-shaped region is encoded, a second mode in which the motion vector and a motion compensated prediction error associated with an arbitrarily-shaped region are encoded, and a third intra-frame mode in which the intensity of each pel in an arbitrarily-shaped region is encoded;

(d) encoding the mode in which each of said plurality of arbitrarily-shaped regions is to be encoded;

(e) encoding the motion vector corresponding to one of said plurality of arbitrarily-shaped regions if the region is to be encoded in either said first mode or said second mode;

(f) encoding a motion compensated prediction error associated with one of said plurality of arbitrarily-shaped regions if the region is to be encoded in said second mode;

(g) encoding the intensity of each pel in one of said plurality of arbitrarily-shaped regions if the region is to be encoded in said third mode; and (h) storing information encoded in steps (b), (d), (e), (f) and (g).

19. The method of claim 18 wherein the step of segmenting said frame comprises the steps of:

(a) dividing the frame into a plurality of smaller regions of predetermined shape and size to form a first segmentation level;

(b) assigning to each of said plurality of smaller regions an initial motion vector;

(c) performing for each of said plurality of smaller regions a motion vector updating routine which updates the motion vector of a smaller region by assigning to it a best motion vector selected from among the initial motion vector assigned to the smaller region, an updated motion vector obtained by performing a block matching technique for the smaller region, and motion vectors of the smaller region's neighboring regions, wherein the best motion vector is selected according to a priority scheme and a predetermined threshold value;

(d) dividing each smaller region in the previous segmentation level into a plurality of smaller regions of predetermined shape and size to form a subsequent segmentation level;

(e) assigning to each of the plurality of smaller regions in the subsequent segmentation level an initial motion vector equal to the motion vector of its parent region;

(f) performing the motion vector updating routine for each of said plurality of smaller regions in the subsequent segmentation level;

(g) iteratively performing the steps (d), (e) and (f) until a stop condition is reached;

(h) merging adjacent smaller regions having similar motion vectors to form said plurality of arbitrarily-shaped regions.

20. The method of claim 19 wherein the motion vector updating routine comprises the steps of:

determining the smallest matching error from among the matching errors obtained respectively by assigning to the smaller region the following motion vectors:

(a) the initial motion vector assigned to the smaller region;

(b) the updated motion vector obtained by performing a block matching technique for the smaller region; and (c) the motion vectors of the smaller region's neighboring regions;

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:

(a) the absolute value of the difference between the smallest matching error and the matching error obtained by using the initial motion vector is not less than the predetermined threshold value; and (b) the absolute value of the difference between the smallest matching error and the matching error obtained by assigning to the smaller region the motion vector of the neighboring region is less than the predetermined threshold value; and selecting the matched motion vector as the best motion vector if:

(a) the absolute value of the difference between the smallest matching error and the matching error obtained by using the initial motion vector is not less than the predetermined threshold value; and (b) the absolute value of the difference between the smallest matching error and each of the matching errors obtained by assigning to the smaller region the motion vector of one of the neighboring region is not less than the predetermined threshold value.

21. The method of claim 20 wherein the steps of encoding the prediction error and encoding the intensity of each pel comprise the steps of:

generating original pel values by:

(a) circumscribing said arbitrarily-shaped region with a rectangular region block, thereby creating an internal pel set which lies within said arbitrarily-shaped image and within said region block, and an external pel set which lies outside said arbitrarily-shaped region and within said region block; and, (b) initializing pel values of said external pel set by extrapolating the pel values of said internal pel set; and calculating optimal transform coefficients (OTC) by:

(a) performing a forward transform on said region block to generate transform coefficients;

(b) generating a transform coefficient set (TCS) from said transform coefficients;

(c) performing an inverse transform on said TCS thereby generating a computed region block having computed pel values;

(d) replacing those computed pel values corresponding to said internal pel set with original pel values to form a modified computed region block (MCRB);

(e) determining whether said TCS represents said OTC;

(f) reiterating steps (a) and (b) on said modified computed region block and outputting said TCS when said TCS represents said OTC; and, (g) reiterating steps (a) through (g) on said modified computed region block when said TCS values do not represent said OTC.

22. The method of claim 21 wherein said step of performing a forward transform comprises the step of performing a discrete cosine transform (DCT).

23. The method of claim 22 wherein the step of generating a TCS comprises the step of quantizing said transform coefficients.

24. The method of claim 23 wherein the step of generating said TCS further comprises the steps of selecting and retaining those transform coefficients which have high energy according to the energy compaction property of transform coefficients, and zeroing the non-selected transform coefficients.

25. The method of claim 18 wherein the steps of encoding the prediction error and encoding the intensity of each pel comprise the steps of:

generating original pel values by:

(a) circumscribing said arbitrarily-shaped region with a rectangular region block, thereby creating an internal pel set which lies within said arbitrarily-shaped image and within said region block, and an external pel set which lies outside said arbitrarily-shaped region and within said region block; and, (b) initializing pel values of said external pel set by extrapolating the pel values of said internal pel set; and calculating optimal transform coefficients (OTC) by:
- (a) performing a forward transform on said region block to generate transform coefficients;
- (b) generating a transform coefficient set (TCS) from said transform coefficients;
- (c) performing an inverse transform on said TCS thereby generating a computed region block having computed pel values;
- (d) replacing those computed pel values corresponding to said internal pel set with original pel values to form a modified computed region block (MCRB);
- (e) determining whether said TCS represents said OTC;
- (f) reiterating steps (a) and (b) on said modified computed region block and outputting said TCS when said TCS represents said OTC; and,
- (g) reiterating steps (a) through (g) on said modified computed region block when said TCS values do not represent said OTC.

26. The method of claim 25 wherein said step of performing a forward transform comprises the step of performing a discrete cosine transform (DCT).

27. The method of claim 26 wherein the step of generating a TCS comprises the step of quantizing said transform coefficients.

28. The method of claim 27 further comprising the step of deciding whether to skip said frame where said step of deciding depends upon the fullness of a buffer which serves as an interface to said decoder.

29. The method of claim 28 wherein the step of determining in which of a plurality of modes image data of each arbitrarily-shaped region is to be encoded is based upon the values of the following normalized sums of absolute differences for the particular region:

$$NSAD_I = \frac{1}{N} \sum_{i \in R} |I_i - m|$$

$$NSAD_P = \frac{1}{N} \sum_{i \in R} |e_i|$$

where N is the total number of pels in the particular region, i is a given pel in the region, R is the set of all pels in the particular region, $I_i$ is the intensity of the given pel i, m is the mean value of the intensity of all the pels in the particular region, and $e_i$ designates the motion compensated prediction error associated with the given pel i.

30. The method of claim 29 wherein image data of the particular region is encoded in said first mode if the value of $NSAD_P$ is less than a threshold value c and in said second mode when the value of $NSAD_P$ exceeds the threshold value c and is less than the value of $NSAD_I$ by at least a threshold value b.

31. The method of claim 30 wherein said threshold values b and c depend upon the fullness of a buffer which serves as an interface to said decoder.

32. The method of claim 24 wherein the number of selected transform coefficients is based upon the size of the particular arbitrarily-shaped region being encoded.

33. The method of claim 23 wherein the step of quantizing said transform coefficients uses a quantization step size which depends upon the fullness of a buffer which serves as an interface to a decoder.

34. A method of encoding a frame in a video sequence comprising the steps of:
- (a) segmenting the frame into a plurality of arbitrarily-shaped regions which may have different dimensions, each having a corresponding motion vector;
- (b) encoding the shape of each arbitrarily-shaped region;
- (c) determining in which of a plurality of modes image data of each arbitrarily-shaped region is to be encoded, where said plurality of modes includes a first mode in which the motion vector corresponding to an arbitrarily-shaped region is encoded, a second mode in which the motion vector and a motion compensated prediction error associated with an arbitrarily-shaped region are encoded, and a third intra-frame mode in which the intensity of each pel in an arbitrarily-shaped region is encoded;
- (d) encoding the mode in which each of said plurality of arbitrarily-shaped regions is to be encoded;
- (e) encoding the motion vector corresponding to one of said plurality of arbitrarily-shaped regions if the region is to be encoded in either said first mode or said second mode;
- (f) encoding a motion compensated prediction error associated with one of said plurality of arbitrarily-shaped regions if the region is to be encoded in said second mode;
- (g) encoding the intensity of each pel in one of said plurality of arbitrarily-shaped regions if the region is to be encoded in said third mode; and
- (h) transmitting information encoded in steps (b), (d), (e), (f) and (g) to a decoder.

35. The method of claim 34 wherein the step of segmenting said frame comprises the steps of:
- (a) dividing the frame into a plurality of smaller regions of predetermined shape and size to form a first segmentation level;
- (b) assigning to each of said plurality of smaller regions an initial motion vector;
- (c) performing for each of said plurality of smaller regions a motion vector updating routine which updates the motion vector of a smaller region by assigning to it a best motion vector selected from among the initial motion vector assigned to the smaller region, an updated motion vector obtained by performing a block matching technique for the smaller region, and motion vectors of the smaller region's neighboring regions, wherein the best motion vector is selected according to a priority scheme and a predetermined threshold value;
- (d) dividing each smaller region in the previous segmentation level into a plurality of smaller regions of predetermined shape and size to form a subsequent segmentation level;
- (e) assigning to each of the plurality of smaller regions in the subsequent segmentation level an initial motion vector equal to the motion vector of its parent region;
- (f) performing the motion vector updating routine for each of said plurality of smaller regions in the subsequent segmentation level;
- (g) iteratively performing the steps (d), (e) and (f) until a stop condition is reached;
- (h) merging adjacent smaller regions having similar motion vectors to form said plurality of arbitrarily-shaped regions.

36. The method of claim 35 wherein the motion vector updating routine comprises the steps of:
determining the smallest matching error from among the matching errors obtained respectively by assigning to the smaller region the following motion vectors:
- (a) the initial motion vector assigned to the smaller region;
- (b) the updated motion vector obtained by performing a block matching technique for the smaller region; and (c) the motion vectors of the smaller region's neighboring regions;

selecting the initial motion vector as the best motion vector if the absolute value of the difference between the smallest matching error and the matching error obtained by using the initial motion vector is less than the predetermined threshold value;

selecting the motion vector of one of the neighboring regions as the best motion vector if:
  (a) the absolute value of the difference between the smallest matching error and the matching error obtained by using the initial motion vector is not less than the predetermined threshold value; and
  (b) the absolute value of the difference between the smallest matching error and the matching error obtained by assigning to the smaller region the motion vector of the neighboring region is less than the predetermined threshold value; and selecting the matched motion vector as the best motion vector if:
  (a) the absolute value of the difference between the smallest matching error and the matching error obtained by using the initial motion vector is not less than the predetermined threshold value; and
  (b) the absolute value of the difference between the smallest matching error and each of the matching errors obtained by assigning to the smaller region the motion vector of one of the neighboring region is not less than the predetermined threshold value.

37. The method of claim 36 wherein the steps of encoding the prediction error and encoding the intensity of each pel comprise the steps of:

generating original pel values by:
  (a) circumscribing said arbitrarily-shaped region with a rectangular region block, thereby creating an internal pel set which lies within said arbitrarily-shaped image and within said region block, and an external pel set which lies outside said arbitrarily-shaped region and within said region block; and,
  (b) initializing pel values of said external pel set by extrapolating the pel values of said internal pel set; and calculating optimal transform coefficients (OTC) by:
  (a) performing a forward transform on said region block to generate transform coefficients;
  (b) generating a transform coefficient set (TCS) from said transform coefficients;
  (c) performing an inverse transform on said TCS thereby generating a computed region block having computed pel values;
  (d) replacing those computed pel values corresponding to said internal pel set with original pel values to form a modified computed region block (MCRB);
  (e) determining whether said TCS represents said OTC;
  (f) reiterating steps (a) and (b) on said modified computed region block and outputting said TCS when said TCS represents said OTC; and,
  (g) reiterating steps (a) through (g) on said modified computed region block when said TCS values do not represent said OTC.

38. The method of claim 37 wherein said step of performing a forward transform comprises the step of performing a discrete cosine transform (DCT).

39. The method of claim 38 wherein the step of generating a TCS comprises the step of quantizing said transform coefficients.

40. The method of claim 39 wherein the step of generating said TCS further comprises the steps of selecting and retaining those transform coefficients which have high energy according to the energy compaction property of transform coefficients, and zeroing the non-selected transform coefficients.

41. The method of claim 34 wherein the steps of encoding the prediction error and encoding the intensity of each pel comprise the steps of:

generating original pel values by:
  (a) circumscribing said arbitrarily-shaped region with a rectangular region block, thereby creating an internal pel set which lies within said arbitrarily-shaped image and within said region block, and an external pel set which lies outside said arbitrarily-shaped region and within said region block; and,
  (b) initializing pel values of said external pel set by extrapolating the pel values of said internal pel set; and calculating optimal transform coefficients (OTC) by:
  (a) performing a forward transform on said region block to generate transform coefficients;
  (b) generating a transform coefficient set (TCS) from said transform coefficients;
  (c) performing an inverse transform on said TCS thereby generating a computed region block having computed pel values;
  (d) replacing those computed pel values corresponding to said internal pel set with original pel values to form a modified computed region block (MCRB);
  (e) determining whether said TCS represents said OTC;
  (f) reiterating steps (a) and (b) on said modified computed region block and outputting said TCS when said TCS represents said OTC; and,
  (g) reiterating steps (a) through (g) on said modified computed region block when said TCS values do not represent said OTC.

42. The method of claim 41 wherein said step of performing a forward transform comprises the step of performing a discrete cosine transform (DCT).

43. The method of claim 42 wherein the step of generating a TCS comprises the step of quantizing said transform coefficients.

44. The method of claim 43 further comprising the step of deciding whether to skip said frame where said step of deciding depends upon the fullness of a buffer which serves as an interface to said decoder.

45. The method of claim 44 wherein the step of determining in which of a plurality of modes image data of each arbitrarily-shaped region is to be encoded is based upon the values of the following normalized sums of absolute differences for the particular region:

$$NSAD_I = \frac{1}{N} \sum_{i \in R} |I_i - m|$$

$$NSAD_P = \frac{1}{N} \sum_{i \in R} |e_i|$$

where N is the total number of pels in the particular region, i is a given pel in the region, R is the set of all pels in the particular region, $I_i$ is the intensity of the given pel i, m is the mean value of the intensity of all the pels in the particular region, and $e_i$ designates the motion compensated prediction error associated with the given pel i.

46. The method of claim 45 wherein image data of the particular region is encoded in said first mode if the value of $NSAD_P$ is less than a threshold value c and in said second mode when the value of $NSAD_P$ exceeds the threshold value c and is less than the value of $NSAD_I$ by at least a threshold value b.

47. The method of claim 46 wherein said threshold values b and c depend upon the fullness of a buffer which serves as an interface to said decoder.

48. The method of claim 40 wherein the number of selected transform coefficients is based upon the size of the particular arbitrarily-shaped region being encoded.

49. The method of claim 39 wherein the step of quantizing said transform coefficients uses a quantization step size which depends upon the fullness of a buffer which serves as an interface to a decoder.

* * * * *